United States Patent
Spicacci

[11] 3,734,835
[45] May 22, 1973

[54] MULTI-STAGE FLASH DISTILLATION PROCESS

[76] Inventor: Attilio R. Spicacci, 22 Allen Street, New Britain, Conn.

[22] Filed: July 29, 1971

[21] Appl. No.: 167,366

[52] U.S. Cl. .................... 203/7, 202/173, 159/2 MS, 203/11
[51] Int. Cl. ......... B01d 3/00, B01d 3/10, B01d 3/02, B01d 1/28
[58] Field of Search ............................ 202/173, 174; 203/11, 10, 7; 159/2 MS

[56] References Cited

UNITED STATES PATENTS

| | | | |
|---|---|---|---|
| 3,344,041 | 9/1967 | Wulfson | 202/173 |
| 3,446,712 | 5/1969 | Othmer | 202/173 |
| 3,467,587 | 9/1969 | Connell et al. | 202/173 |
| 3,486,985 | 12/1969 | McGrath | 202/173 |
| 3,489,652 | 1/1970 | Williamson | 203/11 |
| 3,399,975 | 9/1968 | Otten | 203/7 X |
| 3,476,654 | 11/1969 | Sieder | 203/7 |

Primary Examiner—Norman Yudkoff
Assistant Examiner—J. Sofer
Attorney—Roger B. McCormick, Theodore R. Paulding, Donald K. Huber et al.

[57] ABSTRACT

In a multi-stage flash distillation process, feed liquid to be distilled is progressively preheated by passage along a primary flow path in heat exchange relation with vapor zones of a series of successively staged flash evaporation chambers having flash liquid zones arranged in fluid communication. Flash liquid evaporated from the various flash liquid zones is replenished by feed liquid diverted from the primary flow path to and along secondary or by-pass flow paths leading directly to associated liquid zones. The liquid diverted to each secondary flow path has a temperature substantially equal to the temperature of the flash liquid in the zone to which it is diverted. When the liquid to be distilled contains scale forming materials which tend to precipitate at high temperatures, the liquid is preferably divided into a plurality of parts and at least one of the parts is treated with a suitable scale inhibitor. Feed liquid is tapped from the various parts to provide a plurality of streams of feed liquid which collectively comprise the primary flow path. At least some of the streams contain differing concentrations of scale inhibitor. Each stream is diverted from the primary flow path as aforedescribed when the preheated liquid in the stream attains a temperature slightly below the temperature at which scale deposition tends to occur.

11 Claims, 6 Drawing Figures

Patented May 22, 1973

*INVENTOR.*
ATTILIO R. SPICACCI

BY
McCormick, Paulding & Huber

ATTORNEYS

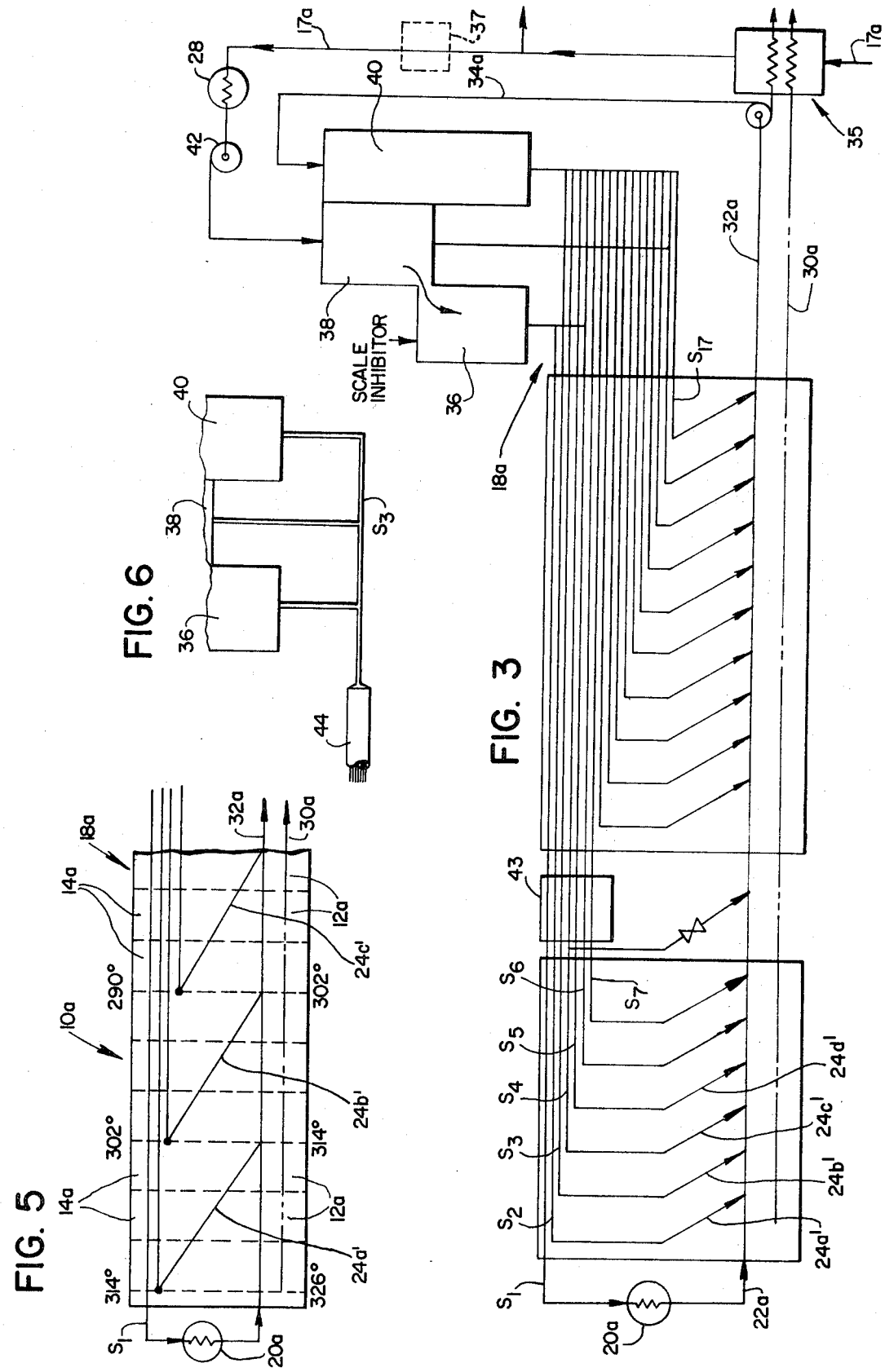

MULTI-STAGE FLASH DISTILLATION PROCESS

BACKGROUND OF THE INVENTION

This invention relates in general to multi-stage flash distillation processes and deals more particularly with improved processes particularly adapted for conversion of saline or brackish water to potable water.

In distillation processes of the aforedescribed general type feed liquid to be distilled is or may be progressively preheated by conveyance in a primary flow path in heat exchange relation with vapor zones of a multi-stage flash evaporator. The preheated feed liquid is ultimately introduced into the first stage of the evaporator where pressure is sufficiently low to cause some of the feed liquid to "flash" or boil instantly to produce steam in a vapor zone thereabove. Vaporization of some of the feed liquid in the liquid zone of the first stage results in a lowering of the temperature of the remaining liquid in the liquid zone of that stage. This liquid then flows into the next successive chamber where some of the liquid flashes and the temperature and pressure of the remaining liquid is again reduced. Condensation occurs when the resulting steam or vapor contacts heat exchange surfaces which define the primary flow path. In this manner, heat removed from the steam to condense it serves to preheat incoming feed liquid. This process is repeated in the apparatus as many times as is feasible. In a process of the aforedescribed type all of the feed liquid is usually raised to the temperature of the flash liquid in the first stage of the evaporator before being introduced into the evaporator, although successive stages of the evaporator operate at substantially lower temperatures. The present invention provides an improved process of the aforedescribed type wherein distribution of feed liquid is improved to increase thermal efficiency.

When the liquid to be distilled contains scale forming materials which tend to precipitate at high temperatures to form deposits on the walls of vessels or tubes in which the feed liquid is contained or conveyed the operating temperature range for the system is generally limited. The tendency of scale formation to occur is further enhanced by concentration of the brine solution as by evaporation. This problem is often overcome by treating feed liquid with a suitable additive to inhibit scale formation in the higher temperature stages, however, no practical benefit is derived from the inhibited feed liquid in the stages of the evaporator which operate at lower temperatures. The present invention provides a process which includes improved distribution of feed liquid for more efficient utilization of scale inhibitors and the like.

SUMMARY OF THE INVENTION

In accordance with the present invention an improved multi-stage flash distillation process is provided wherein feed liquid progressively preheated by passage along a primary flow path in heat exchange relation with vapor zones of successively staged flash evaporation chambers of a multi-stage flash evaporation apparatus is diverted from at least one region of the primary flow path directly into an associated flash liquid zone having a flash liquid temperature substantially equal to the temperature of the feed liquid at said one region. In accordance with a further method of the invention feed liquid containing scale forming materials which tend to precipitate at distillation temperatures is divided into parts and at least one of the parts is treated with a scale inhibitor. Feed liquid selectively tapped from the parts is fed through the apparatus in a plurality of streams which collectively comprise the primary flow path. At least some of the streams contain differing concentrations of scale inhibitor. Each stream is diverted from the primary flow path directly into a flash liquid zone containing flash liquid at substantially the same temperature when the feed liquid in the stream is preheated to a temperature slightly below the temperature at which precipitation of the scale forming materials therein tends to occur.

BRIEF DESCRIPTION OF THE DRAWING

FIG. 3 is a schematic side elevational view of another multi-stage flash distillation apparatus illustrating a further process of the present invention.

FIG. 5 is a fragmentary flow diagram further illustrating the process of FIG. 3.

FIG. 6 is a somewhat schematic side elevational view illustrating a typical arrangement of a single feed tube of the apparatus of FIG. 3.

BRIEF DESCRIPTION OF THE PREFERRED EMBODIMENTS

Figure 1:
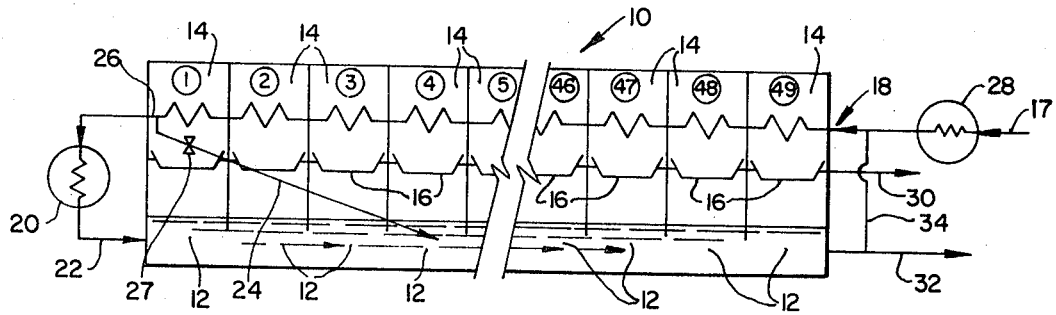
FIG. 1 is a schematic view illustrating a multi-stage flash distillation apparatus incorporating the process of the present invention.

Turning now to the drawings and referring first particularly to FIG. 1, a multi-stage flash distillation apparatus used in practicing a process of the present invention is illustrated somewhat schematically and designated generally by the reference numeral 10. The apparatus 10, as illustrated, is used in the distillation of sea water and comprises a series of forty-nine successively staged flash evaporation chambers designated by encircled numerals 1–49, respectively. Each evaporation chamber has a flash liquid zone 12, a vapor zone 14 and a condensation tray or the like designated at 16 for collecting distillate obtained on condensation of vapor formed in the vapor zone. The liquid zones 12, 12 are in fluid communication with each other and provide a progressive flow path in one direction through the various chambers as indicated by the directional arrows in the liquid zones (FIG. 1). The liquid zones 14, 14 of the various stages 1–49 are maintained at temperatures which progressively decrease in the direction of liquid flow therethrough. Makeup liquid which comprises sea water is conveyed into the apparatus through a conduit or line 17 to and along a primary flow path indicated generally at 18. In the further description which follows, liquid which flows in the primary flow path is designated feed liquid and may, for example, comprise makeup liquid or a mixture of makeup liquid and other liquid, such as recycle brine or makeup liquid that has been treated with a suitable scale inhibitor. The primary flow path 18 passes progressively through at least some of the vapor zones 14, 14 in heat exchange relation therewith and in the direction opposite the direction of liquid flow through the liquid zones. In this manner the feed liquid is preheated as it flows along the primary flow path 18 and vapor in the various vapor zones 14, 14 is simultaneously condensed. At least some of the feed liquid in the primary flow path 18 passes through an external heater 20 where it is further heated prior to being conveyed into the liquid zones through a conduit 22. At least some of the preheated feed liquid is diverted from the primary flow path to and along a secondary or by-pass flow path and directly into an associated liquid zone having a temperature substantially equal to the temperature of the liquid diverted thereto. The apparatus 10 shown in FIG. 1 includes one such secondary flow path 24 which communicates with the primary flow path 18 at one region 26 located in one of the chambers 14, 14 and with the liquid zone of another of the chambers which has a temperature substantially equal to the temperature of the feed liquid at the region 26. For convenience in illustrating the process, a valve 27 is shown associated with the secondary flow path for regulating flow in the latter path. It should be understood that liquid flow in the secondary flow path is preferably regulated by selecting tubes of a proper cross-sectional area to define the secondary flow paths. Another external heating unit 28 is or may be employed to preheat the liquid in the primary flow path 18 before it is conveyed into the apparatus 10, as will be hereinafter further discussed. Distillate or potable water obtained on a condensation of vapor formed in the various vapor zones 14, 14 flows from the apparatus through a conduit 30. Brine formed on concentration of the feed liquid flows from the apparatus through another conduit 32. If desired, some of the brine may be recycled and for this purpose another conduit 34 is provided which communicates with the conduit 32 and the primary flow path 18.

Figure 2:
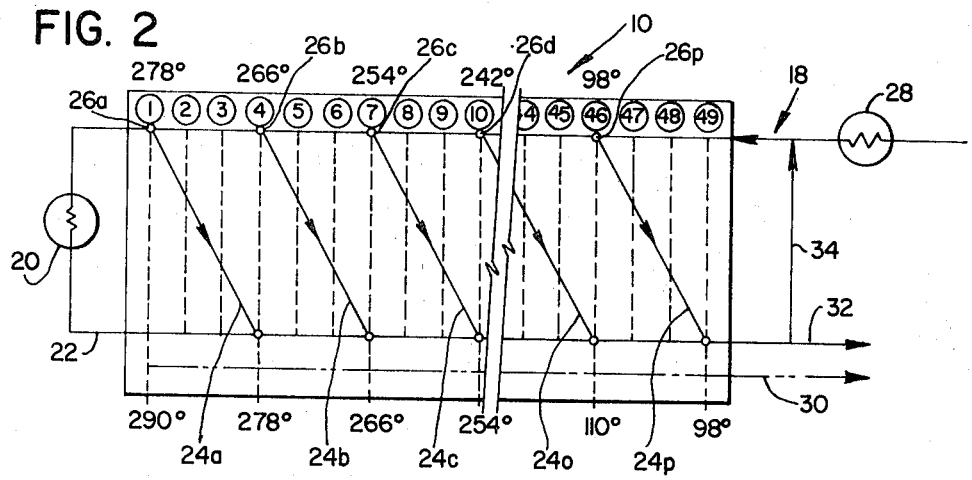
FIG. 2 is a schematic flow diagram further illustrating the process of FIG. 1.

A preferred arrangement of the process discussed with reference to FIG. 1 is further illustrated by the schematic flow diagram of FIG. 2, the flash evaporation chambers being designated by encircled numerals 1–49, respectively. The flash temperature or the temperature of the liquid in the liquid zone in various stages of the apparatus and the corresponding temperatures attained by the preheated feed liquid in the latter stages are respectively designated below and above the diagram. It will be noted that there is a 12° F differential between the temperature of the flashing brine and the temperature of the preheated feed liquid in each of the designated stages. Thus, for example, at the seventh stage the temperature of the flashing brine is 266° F whereas the temperature of the preheated feed liquid at that stage is 254° F. It will be further noted that the temperature of the brine decreases by 12° F as the brine flows progressively through each three successive stages. Thus, the temperature of the flashing brine at the fourth stage is 278° F, whereas the corresponding brine temperature at the seventh stage is 266° F. A plurality of secondary flow paths are provided as indicated at 24a–24p. Each secondary flow path communicates with an associated region of the primary flow path 18 and a flash liquid zone of substantially the same temperature. Thus, for example, the secondary flow path 24b communicates with the primary flow path 18 at region 26b within the fourth stage of the apparatus and with the flash liquid zone of the seventh stage to divert preheated feed liquid at a temperature of 266° F from the primary flow path directly into a liquid zone maintained at substantially the same temperature. The various other secondary flow paths which comprise the system are arranged in substantially the same manner.

Flow in the various secondary or by-pass flow paths is regulated so that feed liquid converted into vapor in each group of three successive stages is replenished in the next successive stage by feed liquid which flows directly from the primary flow path into the flash liquid zone of the latter stage. For example, flash liquid converted into vapor in the fourth, fifth and sixth stages is replenished in the seventh stage by preheated feed liquid which flows directly from the fourth stage into the flash liquid zone of the seventh stage. Sufficient pressure must be maintained in the various flow paths to maintain suitable flow velocity throughout the system and for this purpose the apparatus 10 may include one or more circulating pumps (not shown). However, flow in the various secondary flow paths is preferably regulated so that feed liquid flows from each secondary flow path into a respectively associated flash liquid zone without substantially altering internal pressure of the associated stage into which the feed liquid flows. It will now be evident that the purpose of the preheating unit 28 is to raise the temperature of the feed liquid in the primary flow path 18 so that the temperature of the preheated feed liquid at 4th stage is substantially equal to the flash liquid temperature at the 49th or last stage of the apparatus 10. Thus, a substantially thermally balanced process is attained. It will be further evident that brine or flash liquid at various progressive stages of the process is constantly replenished and thereby diluted by the direct addition of feed liquid which has substantially the same temperature as the flash liquid. All of the foregoing factors contribute toe the maintenance of an efficient well-balanced process.

One of the more difficult problems in the distillation of sea water and the like is prevention of scale formation on heat exchange surfaces. Scale formed in the distillation of sea water consists primarily of calcium carbonate, magnesium, hydroxide and various calcium sulfates, which remain in solution at ordinary temperatures, but which become less soluble at distillation temperatures. As the temperature of the feed liquid increases, these scale forming compounds tend to precipitate forming tenacious deposits on heat exchange surfaces of the distillation apparatus. The formation of scale may be prevented by reducing the operating temperatures of the apparatus or by acidulation of the feed liquid as by the addition of a suitable scale inhibitor, as is well known in the art. The latter solution is generally preferable and, for this reason, most commercial processes employed in the distillation of sea water provide for some pretreatment of the feed water to inhibit scale formation. The present process provides means for effecting efficient treatment and distribution of feed liquid.

Figure 4:
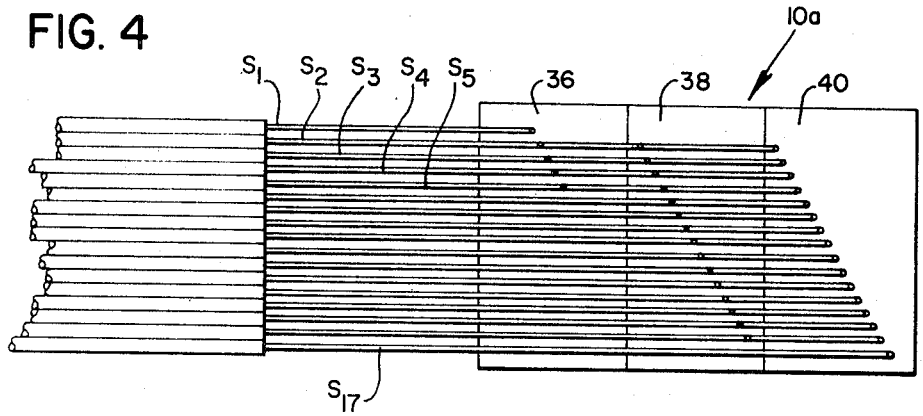
FIG. 4 is a fragmentary schematic bottom view of the distillation apparatus of FIG. 3.

Referring now particularly to FIGS. 3–5, another multi-stage flash distillation apparatus used in practicing the present invention and particularly adapted for use in the distillation of sea water is illustrated somewhat schematically and designated generally by the reference numeral 10a. Parts of the apparatus 10a similar to parts previously described bear the same reference numerals and a letter "a" suffix. The apparatus 10a includes a series of successively staged flash evaporation chambers each of which has a liquid zone 12a and a vapor zone 14a (FIG. 5). The various liquid zones are in fluid communication with each other and with the conduit 32a.

Raw sea water to be distilled enters the apparatus through a conduit or line 17a and passes through conventional heat reject stages designated generally by the numeral 35. In this manner, the brine being discharged from the system and the product water are used to preheat the incoming salt water. The apparatus may, if desired, also include a deaerator or decarbonator, such as indicated at 37 for pretreating the makeup liquid, as is well known in the art.

In accordance with the presently preferred method of practicing the invention, makeup liquid or sea water to be distilled is mixed with recycle liquid and divided into a plurality of parts and at least one of the parts is treated with a suitable scale inhibitor as, for example, acid. Thereafter, liquid is selectively tapped from the various parts to provide a plurality of individual streams of feed liquid which are fed through the apparatus and which collectively comprise a primary flow path.

In the illustrated apparatus 10a, the primary flow path 18a comprises a plurality of individual liquid streams designated S1-S17. Each stream is formed by tapping liquid from at least one of three supply tanks or water boxes designated at 36, 38 and 40. Due to the efficient utilization of scale inhibitors, initial stages of the present apparatus may operate at relatively high temperatures. For this reason, an intermediate heater designated at 43 is or may be provided for increasing the temperatures of the liquid streams S1-S7 before these streams are introduced into the higher temperature stages of the apparatus 10a. The apparatus 10a also has an auxiliary by-pass line 4 which includes a valve 47. This auxiliary by-pass may be used to obtain an improved mass and heat balance in the system or may be used to effect partial shut down of the system. A pump 42 conveys raw sea water through a preheater 28 and into the water box 38. Some of the sea water from the water box 38 flows into the water box 36 where it is treated with a suitable scale inhibitor, as, for example, sulfuric acid to acidulate or neutralize it. Some of the brine discharged from the apparatus through the line 32a is pumped through the line 34a into the water box 40 for recirculation through the apparatus as hereinafter described.

Referring particularly to FIGS. 4 and 5, it will be noted that the feed stream S1 receives treated sea water from the water box 36 and attains a temperature of 326° before being conveyed into the flash liquid zones through the conduit 22a as shown in FIG. 5. The feed line S2 is connected to each of the water boxes 36, 38 and 40 and receives a blend of makeup liquid therefrom particularly suited to be heated to 314° F without precipitation. When the feed liquid in the stream S2 attains a temperature of 314°, all of the liquid in that stream is diverted to and along a secondary flow path 24a' to a flash liquid zone having substantially the same temperature, as best shown in FIG. 5. The makeup liquid in the stream S17 is subjected to much lower temperature and is comprised entirely of recycled brine received from the water box 40, as best shown in FIG. 4. All of the remaining streams S3-S17 comprise blends of feed liquid received from the various water boxes 36-40, the blend which comprises each stream being adapted to be heated to a predetermined temperature without the occurrence of scale formation. An important feature of the aforedescribed system is that each by-pass feed or secondary flow path serves to replenish the flashing brine evaporated from an associated liquid zone with feed liquid of the same temperature and salt concentration as that of the brine entering the flash liquid zone from the flash liquid zone of the preceding stage of the apparatus. Thus, an efficient process is maintained wherein abrupt changes in temperature and salt concentration may be wholly avoided or at least substantially eliminated.

Multi-stage flash evaporation apparatus of the type hereinbefore described with reference to the present process usually includes bundles of tubes which extend through all stages of the apparatus to convey feed liquid therethrough. In the illustrated apparatus 10 and 10a, for convenience of illustration, the various feed lines which convey streams of makeup liquid through the apparatus are shown as individual feed lines or conduits, however, it should be understood that bundles of tubes will preferably be employed to convey makeup liquid through the apparatus, in a manner well known in the art.

In FIG. 6 a typical feed tube arrangement is shown which carries the stream S3. This feed tube is arranged to tap liquid from each of the water boxes 36, 38 and 40 and to convey the resulting blend of feed liquid to the apparatus 10a. The latter feed tube supplies feed liquid to a bundle to tubes designated at 44 which convey the liquid in the primary flow path 18a through various stages of the apparatus. It will be noted that only the stream S1 extends through all stages of the apparatus. Each of the other streams S2-S17 respectively correspond to a bundle of tubes which extend only partially through the various stages of the apparatus 10a. Thus a substantial saving in the quantity of condenser tubing required to make the distillation apparatus may be realized in practicing the present processes.

In a conventional multi-stage flash evaporation apparatus of the type well known in the art, all of the feed liquid passes progressively through all of the vapor stages of the apparatus in heat exchange relation therewith. However, in accordance with the method of the present invention, the quantity of feed liquid in the primary flow path progressively diminishes in the direction of flow through the various stages of the apparatus due to the provision of the various by-pass or secondary flow paths. Thus, the quantity of condenser tubing required for an apparatus for practicing the present invention, as compared to apparatus presently well known in the art, is substantially reduced. It is estimated that a reduction of approximately fifty percent in the quantity of condensing tubing required may be realized in making apparatus to practice the present invention. Since the cost of condenser tubing constitutes about one-third of total plant cost, the reduction of capital expenditure is appreciable.

I claim:

1. A process for the distillation of a feed liquid containing salt in a multi-stage distillation apparatus including a plurality of successively staged flash evaporation chambers each having a flash liquid zone and a vapor zone, each liquid zone except the last being in fluid communication with the next downstream liquid zone to provide a progressive liquid flow path in one direction through the chambers, said process comprising the steps of maintaining the liquid zones at temperatures progressively decreasing in said one direction to flash the liquid in each of the liquid zones whereby to produce vapor in each of the vapor zones, dividing the liquid to be distilled comprising both feed liquid and recycle liquid into a plurality of parts, treating at lest one of said parts with a scale inhibitor, tapping liquid from said parts to provide a plurality of streams of liquid to be distilled, the majority of said streams of liquid to be distilled comprising a selected blend of feed liquid and recycle liquid and a minority comprising feed liquid with scale inhibitor tapped from said parts, conveying each stream of feed liquid along a primary flow path passing progressively through a plurality of said vapor zones in heat exchange relation therewith and in a direction opposite said one direction to simultaneously cool the vapor in said vapor zones and preheat the feed liquid in each of said streams, diverting each stream from said primary flow path in the vapor zone of the associated one of said chambers to and along a secondary flow path and in said one direction to an associated flash liquid zone in another of said downstream chambers wherein the salt concentration of the liquid entering said other chamber liquid zone from the preceding chamber liquid zone is substantially equal to the salt concentration of the diverted stream, said step of diverting to be performed when the temperature of the stream to be diverted is substantially equal to the temperature of the liquid entering said other chamber liquid zone from said preceding chamber liquid zone, and collecting distillate obtained on condensation of vapor formed in said vapor zones.

2. A process as set forth in claim 1 wherein said liquid to be distilled includes distillate from said process, said distillate comprising one of said parts.

3. A process as set forth in claim 1 wherein the step of maintaining the liquid zones is further characterized as maintaining the liquid in each liquid zone at a temperature below the temperature at which scale forming materials therein tend to precipitate.

4. A process as set forth in claim 1 wherein the step of treating at least one of said parts with scale inhibitor is further characterized as treating at least one of said parts with acid.

5. A process as set forth in claim 1 further characterized by said step of diverting being performed when the temperature of the stream to be diverted is below the temperature at which scale forming materials therein tend to precipitate.

6. A process as set forth in claim 5 including the additional step of regulating flow of liquid from each said stream to said associated flash liquid zone to continuously replenish flashed liquid partially converted to vapor in said associated flash liquid zone to maintain a substantially constant quantity of flash liquid in said associated flash liquid zone.

7. A process as set forth in claim 5 including the additional step of regulating flow of feed liquid from each said stream to its associated flash liquid zone to permit feed liquid to flow from said stream into said associated flash liquid zone without substantially altering the pressure in said other chamber.

8. A process as set forth in claim 5 including the additional step of further heating said feed liquid containing scale inhibitor after it has been preheated by passing progressively through the vapor zones and before it is conveyed to said flash liquid zones.

9. A process as set forth in claim 5 including the additional step of further heating at least some of said streams comprising said primary flow path by passing the latter streams through an external heat source after said latter streams have passed progressively through some of said vapor zones and before passing said latter streams through the remaining vapor zones.

10. A process as set forth in claim 5 including the additional step of preheating the feed liquid before passing it progressively through said vapor zones.

11. A process as set forth in claim 10 wherein the step of preheating said feed liquid is further characterized as preheating said feed liquid before passing it progressively through the remainder of said vapor zones to increase the temperature of the lowest temperature stream subsequent to said preheating to be diverted to a temperature substantially equal to the temperature of the liquid entering the liquid zone of the last of said successively staged chambers from the liquid zone of the preceding chamber.

* * * * *

PO-1050
(5/69)

UNITED STATES PATENT OFFICE
CERTIFICATE OF CORRECTION

Patent No. 3,734,835    Dated    May 22, 1973

Inventor(s)  Attilio R. Spicacci

It is certified that error appears in the above-identified patent and that said Letters Patent are hereby corrected as shown below:

Col. 4, line 24, "4th" should be -- 46th --.

Col. 4, line 32, "toe" should be --to--.

Signed and sealed this 20th day of November 1973.

(SEAL)
Attest:

EDWARD M. FLETCHER, JR.          RENE D. TEGTMEYER
Attesting Officer                Acting Commissioner of Patents